(12) United States Patent
Groth et al.

(10) Patent No.: US 11,471,934 B2
(45) Date of Patent: Oct. 18, 2022

(54) METHOD FOR PRODUCING A CAST VEHICLE WHEEL

(71) Applicant: Bayerische Motoren Werke Aktiengesellschaft, Munich (DE)

(72) Inventors: Kristian Groth, Munich (DE); Andreas Krause, Stockdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/425,988

(22) PCT Filed: Jan. 23, 2020

(86) PCT No.: PCT/EP2020/051615
§ 371 (c)(1),
(2) Date: Jul. 27, 2021

(87) PCT Pub. No.: WO2020/156920
PCT Pub. Date: Aug. 6, 2020

(65) Prior Publication Data
US 2022/0161316 A1 May 26, 2022

(30) Foreign Application Priority Data
Jan. 28, 2019 (DE) ...................... 10 2019 102 067.0

(51) Int. Cl.
*B22C 9/10* (2006.01)
*B22C 9/28* (2006.01)
(Continued)

(52) U.S. Cl.
CPC .................. *B22C 9/10* (2013.01); *B22C 9/28* (2013.01); *B22D 15/005* (2013.01); *B60B 1/08* (2013.01);
(Continued)

(58) Field of Classification Search
CPC .. B22C 9/10; B22C 9/108; B22C 9/28; B22D 15/00; B22D 15/005; B22D 29/00; B22D 29/001; B60B 1/08; B60B 3/10
(Continued)

(56) References Cited

U.S. PATENT DOCUMENTS 3,253,862 A * 5/1966 Watanabe et al. ........ B22C 9/28
164/112
4,035,895 A * 7/1977 Lester ...................... B60B 1/08
301/6.9
(Continued)

FOREIGN PATENT DOCUMENTS

DE      41 38 558 C2     5/1994
DE     196 34 535 C1     8/1997
(Continued)

OTHER PUBLICATIONS

Machine translation of DE 102007040391 A1 (Year: 2008).*
(Continued)

*Primary Examiner* — Kevin P Kerns
(74) *Attorney, Agent, or Firm* — Crowell & Moring LLP

(57) ABSTRACT

A method for producing a one-piece cast vehicle wheel, the wheel having at least one hub portion connected to a wheel rim via at least one spoke oriented in the radial direction of the wheel, in which at least one lost core is inserted in a molding of the casting machine, the one-piece vehicle wheel is cast, and the lost core is removed from the cast vehicle wheel and thereby forms at least one opening in the spoke. A one-piece cast vehicle wheel formed by the method is also provided.

16 Claims, 5 Drawing Sheets

(51) Int. Cl.
    *B22D 15/00* (2006.01)
    *B60B 1/08* (2006.01)
    *B60B 3/10* (2006.01)
(52) U.S. Cl.
    CPC .......... *B60B 3/10* (2013.01); *B60B 2310/202* (2013.01); *B60B 2900/111* (2013.01); *B60B 2900/1216* (2013.01); *B60B 2900/572* (2013.01)
(58) Field of Classification Search
    USPC .............................. 164/15, 30, 132, 137, 369
    See application file for complete search history.

(56) References Cited

U.S. PATENT DOCUMENTS

| | | | |
|---|---|---|---|
| 5,538,329 A * | 7/1996 | Stach | B60B 1/00 29/894.342 |
| 6,471,303 B1 | 10/2002 | Hummel et al. | |
| 7,452,037 B1 | 11/2008 | Nunes | |
| 2016/0288564 A1 | 10/2016 | Ishikawa et al. | |
| 2017/0136811 A1 | 5/2017 | Müller et al. | |

FOREIGN PATENT DOCUMENTS

| | | |
|---|---|---|
| DE | 198 29 331 A1 | 1/2000 |
| DE | 101 46 972 A1 | 4/2003 |
| DE | 199 26 575 C2 | 4/2003 |
| DE | 10 2007 040 391 A1 | 3/2008 |
| DE | 10 2007 046 124 B4 | 12/2012 |
| DE | 10 2014 115 185 A1 | 4/2016 |
| DE | 10 2016 216 536 A1 | 3/2018 |
| EP | 3 199 371 A1 | 8/2017 |
| JP | 2009-106957 A | 5/2009 |

OTHER PUBLICATIONS

International Search Report (PCT/ISA/210) issued in PCT Application No. PCT/EP2020/051615 dated Feb. 25, 2020 with English translation (six (6) pages).
German-language Written Opinion (PCT/ISA/237) issued in PCT Application No. PCT/EP2020/051615 dated Feb. 25, 2020 (seven (7) pages).
German-language Search Report issued in German Application No. 10 2019 102 067.0 dated Oct. 18, 2019 with partial English translation (13 pages).
Presseinformation. Schnelle Prototypen—und Kleinserienfertigung: Bosch Rexroth Giesserei fertigt Formen mit 3D-Druck, Mar. 11, 2015, https://dc-de.resource.bosch.com/media/de/press_release_1/2015/maerz/150311_PI_3D-Druck_Giesserei_de.pdf [abgerufen am Oct. 18, 2019] (three (3) pages).
Chinese-language Office Action issued in Chinese Application No. 202080011069.8 dated May 12, 2022 with English translation (14 pages).

* cited by examiner

METHOD FOR PRODUCING A CAST VEHICLE WHEEL

BACKGROUND AND SUMMARY OF THE INVENTION

The invention relates to a method for producing a cast vehicle wheel and to a vehicle wheel.

Reference is made by way of example to German patent documents DE 10 2007 046 124 B4, DE 199 26 575 C2 and DE 41 38 558 C2.

Wheels of vehicles, in particular wheels of passenger vehicles, are subject to a very wide variety of requirements. In addition to sufficient strength at a low weight, the wheels are intended to be favorable for a good coefficient of air resistance of the vehicle and to be distinguished by a pleasing visual appearance.

A wheel known from the prior art customarily comprises a hub section and a rim section, wherein these two sections are customarily connected to one another by a plurality of spokes.

Different variants for reducing the weight of the spokes or the spoke bodies of cast vehicle wheels and thus for reducing the unsprung masses are known from the prior art. In contrast to forged vehicle wheels, cast vehicle wheels are customarily more solid because of being less strong, and therefore they are generally heavier.

DE 10 2007 046 124 B4 describes a cast vehicle wheel in which a hollow body is integrated as a mold core in the spoke during the casting process. A disadvantage of this, however, is that such a mold core always remains in the vehicle wheel after the casting process and a sufficiently strong connection between the mold core and the material of the wheel can be realized only with difficulty. In addition, such mold cores are complicated to produce.

By contrast, one or more cast spokes of a wheel that are hollow are known from DE 199 26 575 C2 and DE 41 38 558 C2. For this purpose, a lost core is placed into the casting mold of the spokes during the casting process. The lost core is removed from the spoke after the casting process and the then hollow spoke is connected after the casting process to the hub or to the rim.

However, such an embodiment has the disadvantage that the spoke has to be connected retrospectively to the hub or to the rim of the wheel. The production process of the wheel is therefore long and costly.

It is the object of the invention to specify a method for producing a vehicle wheel, which method can be carried out cost-effectively and simply and at the same time provides a vehicle wheel which is reduced in weight and is optimized in respect of rigidity and strength.

The object is achieved by a method for producing a cast vehicle wheel in which at least one lost core is inserted into a molding of the casting machine, the one-piece vehicle wheel is cast, the lost core is removed from the cast vehicle wheel, and after removal of the lost core the vehicle wheel includes at least one opening in at least one spoke. The object is further achieved in the form of a vehicle wheel formed with a lost core using the method of the present invention. Advantageous embodiments and developments are the content of the dependent claims.

The vehicle wheel (also referred to for short as wheel), for its part, is accordingly produced in a casting method, in particular in a diecasting method. The vehicle wheel here is formed in particular from a cast aluminum material or a cast steel material or of an alloy of these materials.

In the casting process, the vehicle wheel is produced from liquid metal (for example aluminum or steel or a suitable alloy) which is also referred to as the melt. Use is made here in particular of what is referred to as dead mold casting, in which the melt is poured into a hollow mold in which it subsequently solidifies. In the diecasting method, for example, an upper die or mold and a lower die or mold compresses the liquid melt in its desired shape until it solidifies. The inner surface of this hollow mold or die is the negative of the outer surface of the casting.

The (ready cast) vehicle wheel comprises a hub section which is connected to an annular rim via at least one radially running spoke. Preferably, a plurality of spokes are provided which are adjacent to one another and form at least one spoke intermediate space which is bounded by the spoke side surfaces oriented in the circumferential direction of the wheel and by the hub section and the rim.

During the production of such a vehicle wheel, it is provided, in a first step, before the actual casting process that at least one "lost core" is inserted into a molding, for example into a die mentioned, i.e. between the upper die and the lower die of the vehicle wheel to be cast.

Such a lost core is in particular a sand core. Alternatively or additionally, the lost core can also be in the form of a graphite core, a fireclay core, a clay or ceramic core, a glass core, a salt core, (compressed and pressed) carbon fibers or a mixture of the materials mentioned or further materials, which core can be removed from the wheel after the casting process of the vehicle wheel. The lost core is removed here by suitable methods.

The sand core mentioned is preferably used here since the latter also brings advantages in respect of the flow properties of the melt and the associated better solidification properties.

Preferably, such a lost core, in particular a sand core, is introduced into the molding by what is referred to as a core shooting method. In a core shooting machine, a basic mold material mixed with a binder is introduced into a core mold with a certain shooting pressure and possibly defined operating temperature. After the curing of the casting core produced in such a manner, the latter is preferably inserted into the casting mold. Following the casting which has taken place, the molding material from which the core has been produced is removed through the openings provided for this purpose in the casting structure.

It is particularly preferably provided here that a graphite material is used as a binder. A graphite sizing is thus arranged on the lost core, as a result of which the surface of the wheel solidified against the lost core is smoother and less rough.

Alternatively or additionally, it is also possible to produce the lost core or parts thereof by what is referred to as a 3D printing method. For example, one part of the core can be produced by the core shooting method mentioned, while another part of the core is produced by the 3D printing method. The individual parts can subsequently be connected by adhesive bonding (for example by means of a graphite material). For example, the lost core or parts thereof can be produced in a casting, punching, weaving or other 3D molding method.

It is furthermore possible here for a plurality of lost cores to be inserted into the molding.

Preferred geometrical forms of the lost core will be discussed in more detail further below.

In a next step of the method for producing the vehicle wheel, it is provided that the vehicle wheel is cast in one piece. Within the context of this invention, a one-piece wheel is a wheel which is produced completely, i.e. with a rim, with one or more spokes and with a hub section, as it were "in one casting" after the casting process or by the casting process. The individual wheel parts, for example the rim, the hub or the spokes, no longer have to be connected to one another retrospectively, but rather are already produced from one piece in the casting method.

After the casting process of the vehicle wheel, it is provided that the lost core, in particular the sand core, is removed from the cavity or space of the vehicle wheel by a suitable method. It is furthermore provided here that the lost core, after its removal, forms at least one opening in the at least one spoke.

Such an opening here is in particular a recess or an undercut or an undercut stamping or an aperture through the spoke. It is not envisaged producing a closed cavity in the spoke by removal of the lost core; instead, the spoke in the state ready for use (i.e. when the spoke is mounted on the vehicle and is ready for operation) always comprises the opening mentioned by means of removal of the lost core.

It is particularly preferably provided here that the opening mentioned is arranged on at least one spoke side surface of the spoke running at least approximately in the axial direction of the wheel. If a plurality of spokes are present, the spoke side surfaces can be described as the surface forming the abovementioned spoke intermediate space together with a hub section and a rim section. The spoke side surfaces are those surfaces of the spoke that are oriented in the circumferential direction of the wheel and are in each case opposite one another in a spoke intermediate space.

That is to say, it is preferably not the outer or inner spoke surface which is provided with the opening mentioned, but rather the spoke side surface. The opening is thus preferably provided in the circumferential direction in or on the spoke.

Particularly preferably, an aperture is produced in the circumferential direction through the spoke by removal of the lost core.

However, it is additionally possible also to form an opening or a recess on one or more spoke outer surfaces or spoke inner surfaces by means of the lost core or by removal thereof. Within the context of this invention, such a spoke outer surface is that surface of the spoke which, in the installed state of the vehicle wheel in the vehicle, faces away from the vehicle and is oriented at least approximately in the axial direction of the vehicle wheel. Within the context of this invention, a spoke inner surface means that surface of the vehicle wheel which, in the installed state of the vehicle wheel in the vehicle, faces the vehicle and is likewise at least approximately oriented in the axial direction of the vehicle wheel.

Furthermore, it is possible for the spoke to be machined or blasted (for example in a sandblasting method) or trowalized following the method of casting the vehicle wheel. All these methods serve, for example, to smooth the spoke surface that is roughened by the lost core, in particular the sand core. Furthermore, it is possible to remove excess material on the wheel or on the spoke or the spokes by subsequent machining.

Furthermore, it is preferably provided for there to be mechanical processing on a part of a spoke surface of the ready cast wheel, on which no opening is formed after removal of the lost core. It is thus possible, for example, that, by milling or drilling on that surface mentioned, an additional opening is produced which opens in the opening of the spoke, which opening is formed by the lost core. A skeleton structure of the spoke can thus be produced in an advantageous manner.

The method mentioned permits the production of a vehicle wheel with one or more spokes provided with apertures and openings. The opening or openings in the spoke or in the spokes of the wheel, such as, for example, the mentioned apertures, recesses and undercuts, permit a saving on material and at the same time an enlargement of the surface of the spokes and thus an increased rigidity and strength of the spoke and of the wheel itself. Furthermore, it is possible by the method mentioned to produce a vehicle wheel cost-effectively (in a casting method) and nevertheless to reproduce different geometries and designs of the spokes.

In addition to the method for producing the vehicle wheel, a vehicle wheel which is produced by the inventive method is claimed. As already mentioned further above, this vehicle wheel comprises a hub section which is connected to a rim of the wheel via at least one spoke which is oriented in the radial direction of the wheel. The at least one spoke here comprises an opening which is mentioned and which is produced on the spoke in a cost-effective and simple manner by the method according to the invention, in particular by removal of the lost core. Preferably, a plurality of spokes are provided which are adjacent to one another and form at least one spoke intermediate space which is bounded by the spoke side surfaces, which are oriented in the circumferential direction of the wheel, and by the hub section and the rim. This opening is produced here by the removal of the lost core mentioned.

As likewise mentioned further above, the opening can be an undercut, a recess or an aperture of the spoke.

The opening here is preferably provided on at least one spoke side surface.

It is thus particularly preferably provided that the opening is an aperture which runs in the circumferential direction of the spoke and separates or divides the spoke into an outer spoke part (facing the outside in the installed state of the wheel) and an inner spoke part (facing the vehicle in the installed state of the wheel in the vehicle). This aperture can extend, for example, over the (entire) length of the spoke (as viewed in the radial direction), as a result of which, in such a case, the spoke would be divided in two in the axial direction of the wheel.

However, it is additionally possible, as already mentioned above, also to form an opening or a recess on one or more spoke outer surfaces or spoke inner surfaces by means of the lost core or by its removal.

In order to realize such an opening in the spoke, in particular on one or on both spoke side surfaces, it is preferably provided that the lost core is in the shape of a section of a ring. It is thus possible for the lost core after the casting operation of the vehicle wheel to project through the at least one spoke in the circumferential direction of the vehicle wheel and to thus constitute an aperture mentioned (upon removal).

If a plurality of spokes are provided with the same opening in each case and the wheel is thus formed, for example, symmetrically, it is preferred that the lost core is a continuous ring or is annular, wherein the lost core is inserted into the molding or into the die in such a manner that the ring center point is positioned on the axial axis of the vehicle wheel.

In the case of a plurality of spokes which comprise an aperture or an opening, it is preferred that, after the casting process of the wheel (i.e. before the core is removed), the lost core is arranged in the spoke side surfaces in such a manner that it projects through a spoke or projects at least into two spoke intermediate spaces. Particularly preferably if the lost core is annular, this ring projects fully through all of the spokes at once.

In addition to such apertures, it is possible to provide rib-like or undulating structures or surfaces in the spoke interior or on the surfaces of the opening in the spoke. Such structures increase the surface of the spoke and, in addition to the rigidity and strength, also optimize the cooling properties of the vehicle wheel.

Furthermore, it is possible for the lost core to be formed in such a manner that the ready cast wheel has a fastening device or the like in the opening according to the invention after removal of the lost core. It is possible, for example, for a cover element for covering a spoke intermediate space of the spokes or for a wheel cap to be fastened to such a fastening device. Such a fastening device can be designed, for example, in the form of a latching lug, a notch or the like. For example, such a cover element can be hooked or clipped into the edge which arises by means of the additional opening mentioned between the opening formed by the removal of the core and the additional opening. The edge or the additional opening can also be in the form of a latching lug, a bore or a notch. Detailed embodiments can be gathered from the Figures.

These and further features emerge not only from the claims and the description but also from the drawings, wherein the individual features can be realized in each case by themselves or as a plurality in the form of subcombinations in an embodiment of the invention and can constitute advantageous and inherently protectable embodiments for which protection is claimed here.

The invention is explained in further detail below with reference to a plurality of exemplary embodiments. All of the features described in more detail may be essential to the invention.

DETAILED DESCRIPTION OF THE DRAWINGS

Figure 1:
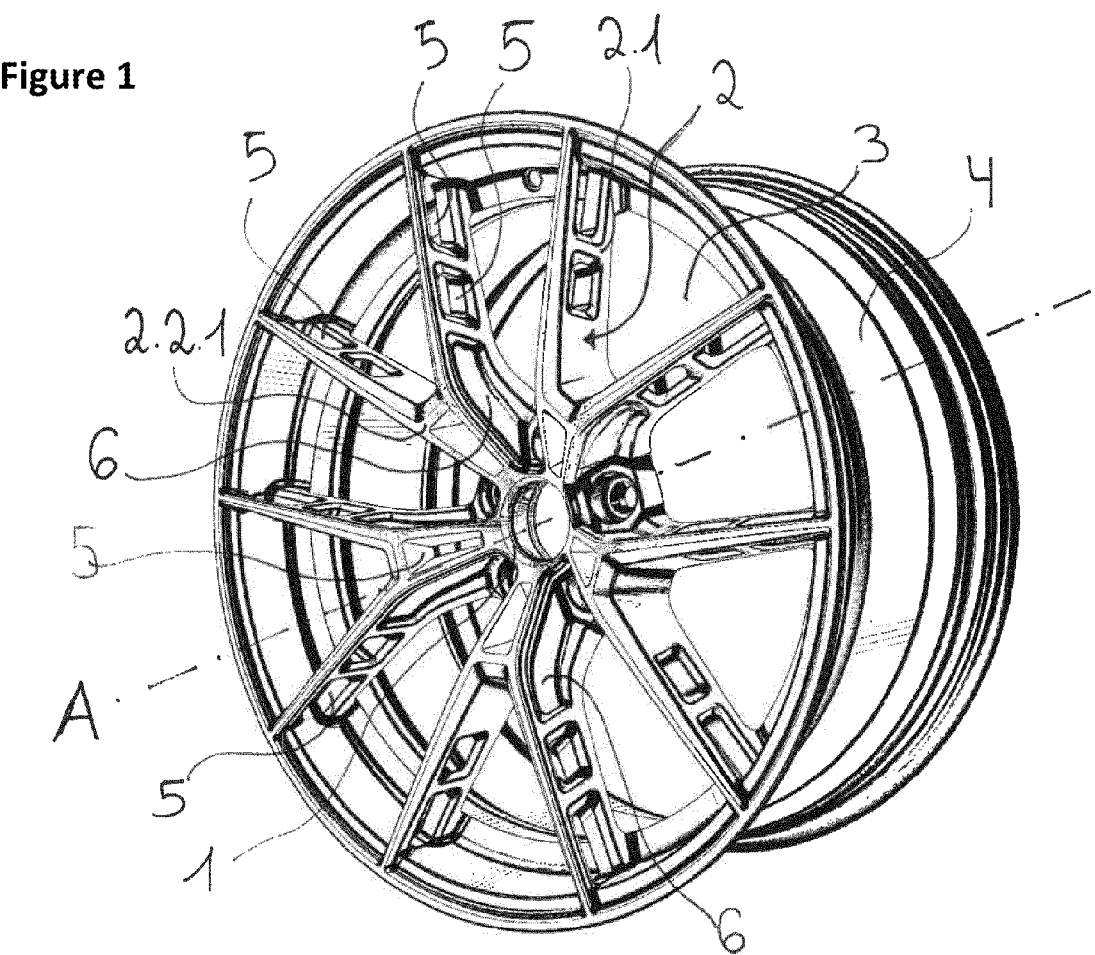
FIG. 1 shows schematically a vehicle wheel according to an embodiment of the present invention in a three-dimensional view from the front.

As illustrated in the exemplary embodiment in FIG. 1, a vehicle wheel produced according to the method according to the invention comprises a hub section 1 which is connected to a rim or a rim section 4 via a plurality of spokes 2 which are oriented in the radial direction of the wheel. Furthermore, the vehicle wheel shows a plurality of spoke intermediate spaces 3 arranged between two adjacent spokes 2. The wheel, i.e. with the rim 4 mentioned, the spokes 2 and the hub section 1, is cast in one piece as a whole. Furthermore, it is provided that the spokes 2 includes a plurality of apertures 5 and recesses 6 by removal of a lost core 7 after the process of casting the one-piece vehicle wheel.

Such an opening can be realized, for example, by an aperture 5 through the entire spoke material or as a recess 6 (can also be referred to as an undercut stamping) or as a groove in a spoke 2.

It is possible here, as can likewise be seen in FIG. 1, that such an aperture 5 or such a recess 6 is arranged on a spoke side surface 2.1 or on a spoke outer surface 2.2.1 (or on a spoke inner surface 2.2.2). Within the context of this invention, such a spoke outer surface 2.2.1 is that surface of the spoke 2 which, in the installed state of the vehicle wheel in the vehicle, faces away from the vehicle and is oriented at least approximately in the axial direction A of the vehicle wheel. Within the context of this invention, a spoke inner surface 2.2.2 means that surface of the vehicle wheel which, in the installed state of the vehicle wheel in the vehicle, faces the vehicle and is likewise oriented at least approximately in the axial direction A of the vehicle wheel. The spoke side surfaces 2.1 are those spoke surfaces which are oriented in the circumferential direction of the wheel and form, inter alia, the spoke intermediate space 3.

Figure 2:
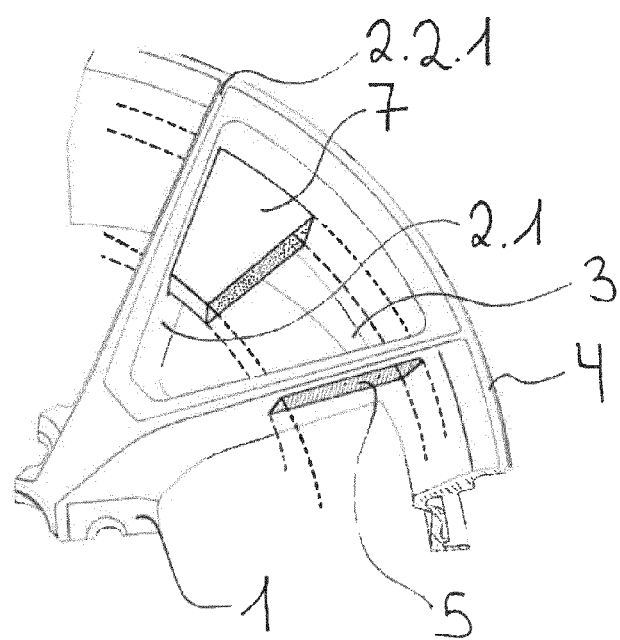
FIG. 2 shows a detailed view of part of the vehicle wheel of FIG. 1 from the front, wherein a lost core is illustrated before removal from the cast vehicle wheel.

In order to realize a wheel which is cast in one piece and has such undercuts or recesses 6 or apertures 5, it is provided that the wheel is produced in a casting method. It is furthermore provided, as can be seen by way of example in FIG. 2, that, before the process of casting the wheel, what is referred to as the lost core 7 is inserted into the molding of the casting machine. The wheel is then cast in one piece with the lost core. After the casting process, the lost core 7 is still situated in the vehicle wheel, as shown by way of example in FIG. 2. For example, the lost core can be designed as a section of a ring in the circumferential direction of the wheel. By subsequent removal of the lost core 7, for example by shaking it out or by vibration, the aperture 5 mentioned or the recess 6 mentioned or the undercut is formed. FIG. 2 shows the lost core 7 still situated in a first spoke 2 after the casting process. The aperture 5 which is formed when the lost core 7 is removed from the wheel or from the spoke 2 is shown in a further spoke 2 in FIG. 2. Using an annular lost core 7 (as illustrated by the dashed line in FIG. 2) which extends in a closed manner about a circumference of a circular portion of the wheel, such an aperture 5 or a recess 6 can be formed at always the same location on each spoke 2 of the wheel. However, it is also possible to arrange a plurality of individual lost cores 7.

Figure 3:
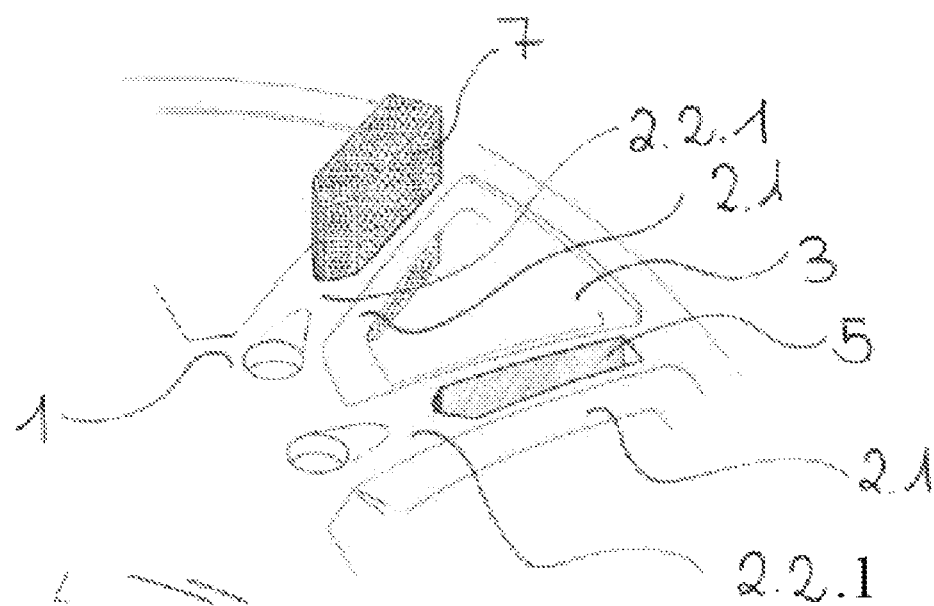
FIG. 3 shows a detailed view of part of a vehicle wheel of FIG. 1 from the front, wherein a lost core is illustrated before removal from the cast vehicle wheel.

The lost core 7 from FIG. 2 is arranged at least approximately in the circumferential direction of the wheel, wherein the aperture 5 or the recess 6 which is formed by removal of the lost core 7 is arranged on a spoke side surface 2.1. It is alternatively or additionally also possible, as can be seen in FIG. 3, to orient the lost core in the axial direction A of the vehicle wheel and thus to form or to arrange an aperture 5 or a recess 6 on the spoke outer surface 2.2.1 or on the spoke inner surface 2.2.2 after removal of the lost core 7. FIG. 3 also shows a first spoke 2 in an outer view of the wheel, in which the lost core 7 is still arranged in the spoke 2, and a second spoke 2, in which the lost core 7 has already been removed and an aperture 5 thereby being formed.

FIGS. 4 to 7 each show different embodiments or geometries of one or more lost cores 7 in a ready cast vehicle wheel.

Figure 4:
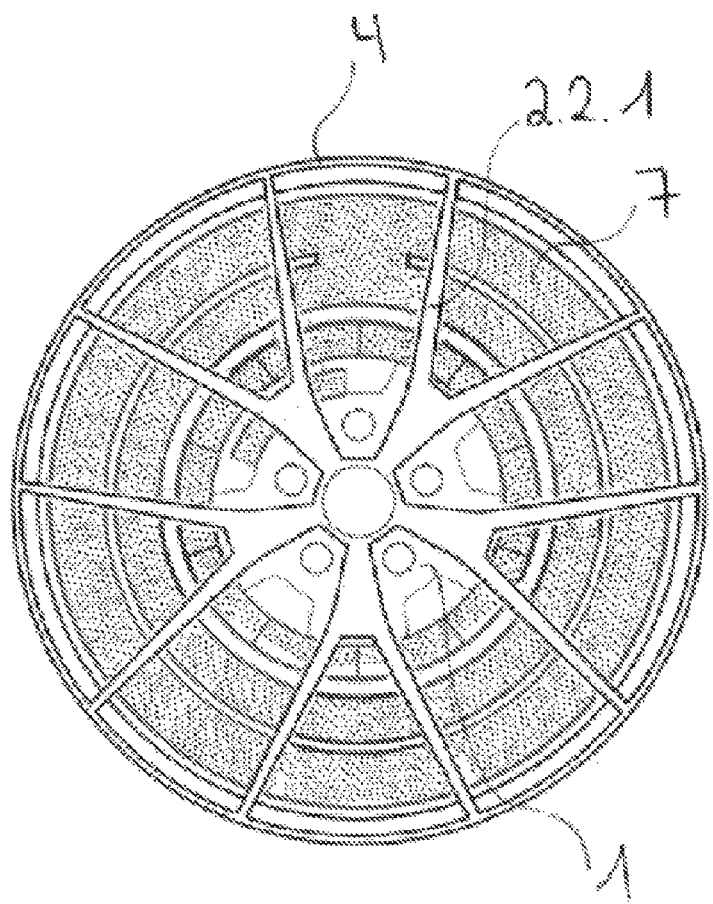
FIGS. 4 to 7 each show examples of a vehicle wheel in a front view, wherein a lost core is illustrated in different embodiments before removal from the cast vehicle wheel.

As shown in FIG. 4, the lost core 7 can be designed as a continuous annular body which is capable upon removal of forming a plurality of apertures 5 or recesses 6 per spoke 2 of the wheel.

Figure 5:
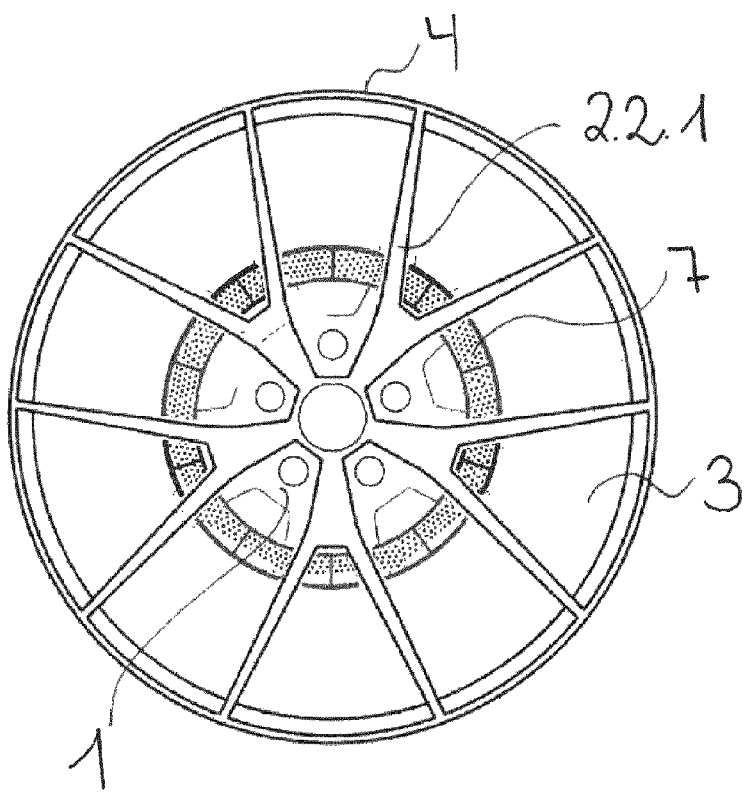

As illustrated in FIG. 5, it is also possible to form an annular lost core 7 by a plurality of lost cores 7 that are adjacent next to one another and are in the shape of a section of a ring being arranged only on a certain radius of the wheel (for example only in the vicinity of the hub).

Figure 6:
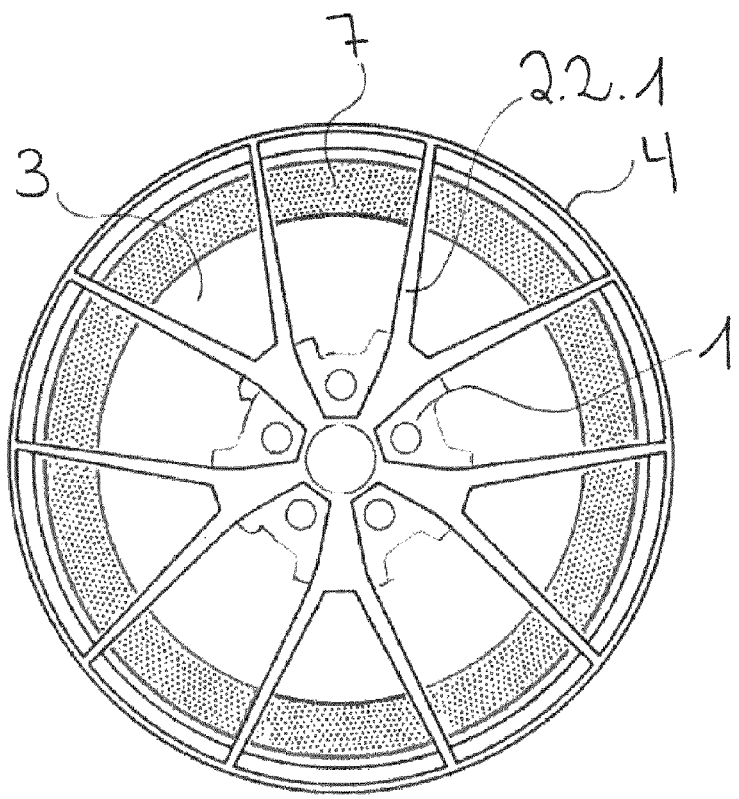
Figure 7:
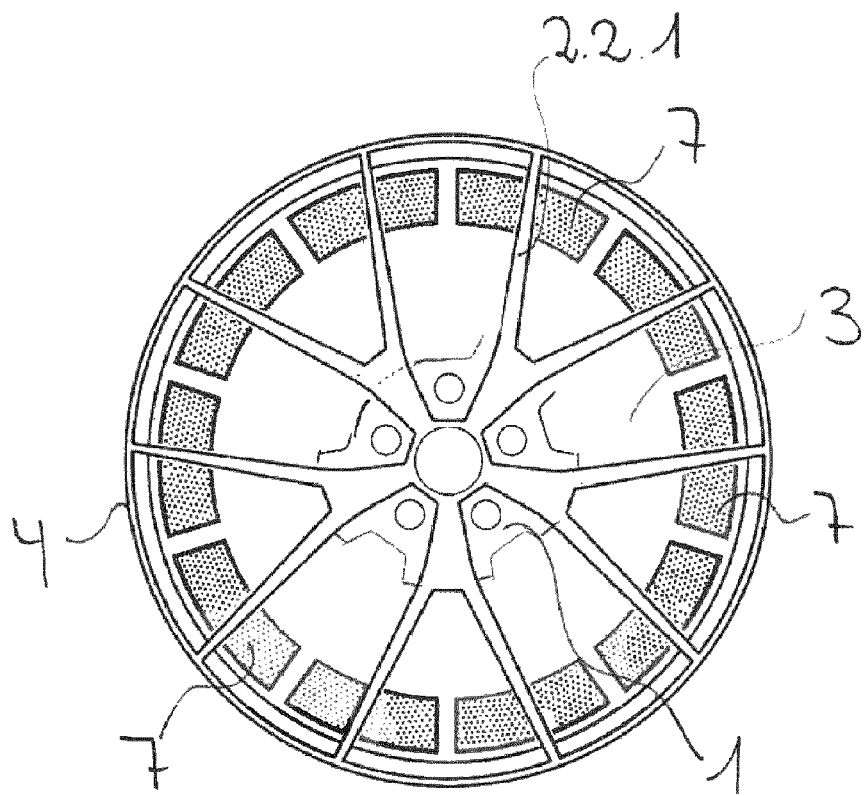

Similarly, as shown in FIG. 6, an (at least approximately) annular lost core 7 can be arranged on an outer radius of the wheel, i.e. in the direct vicinity of the rim, in a manner extending over the circumference of the wheel, and therefore, when the lost core is removed, an aperture 5 is formed on such an outer radius of the wheel on all of the spokes 2 of the wheel. FIG. 7 shows an embodiment in which the aperture 5 on the respective spokes 2 is not formed by a cohesive annular lost core 7 (as in FIG. 6), but rather by individual lost cores 7 in the shape of a section of a ring.

By means of the arrangement of such a lost core, any conceivable geometric configuration of a spoke 2 is possible. For example, by means of a suitable arrangement of a lost core 7 and by means of the removal of the lost core 7 after the casting process, two spokes 2 which are offset with respect to one another in the axial direction A are formed.

It is likewise possible for the lost core 7 to be divided into two, as viewed in the axial direction A of the wheel. For example, the two parts can then be connected by a suitable adhesive. Furthermore, it is possible to produce a complex structure of the lost core 7 by producing the lost core 7 in an additive production method, such as a 3D printing method.

It is possible by means of such complex geometries of one or more lost cores 7 for the entire spoke geometry/design to be able to be produced exclusively by the lost core 7.

Figure 8:
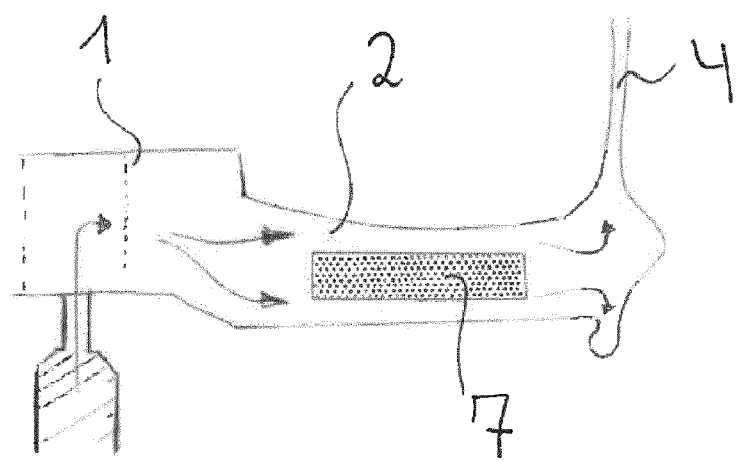
FIG. 8 shows a vehicle spoke in a sectional view through an axis of rotation of the wheel in accordance with an embodiment of the present invention, the vehicle spoke just being cast.

FIG. 8 shows, by way of example, the casting process of a spoke 2 with a lost core 7, which is inserted into a molding (not shown) of a casting machine, in a sectional view through the axial axis A of the wheel. The melt flow is illustrated here in the form of arrows. It is apparent here how the liquid melt flows from the hub 1 of the wheel as far as the rim 4 of the wheel. The melt fully flows over the lost core 7. After the melt has subsequently hardened and the wheel cast in one piece removed from the molding, the lost core 7 can be removed from the wheel, with the aperture 5 mentioned or the recess 6 arising in the spoke 2.

Figure 9:
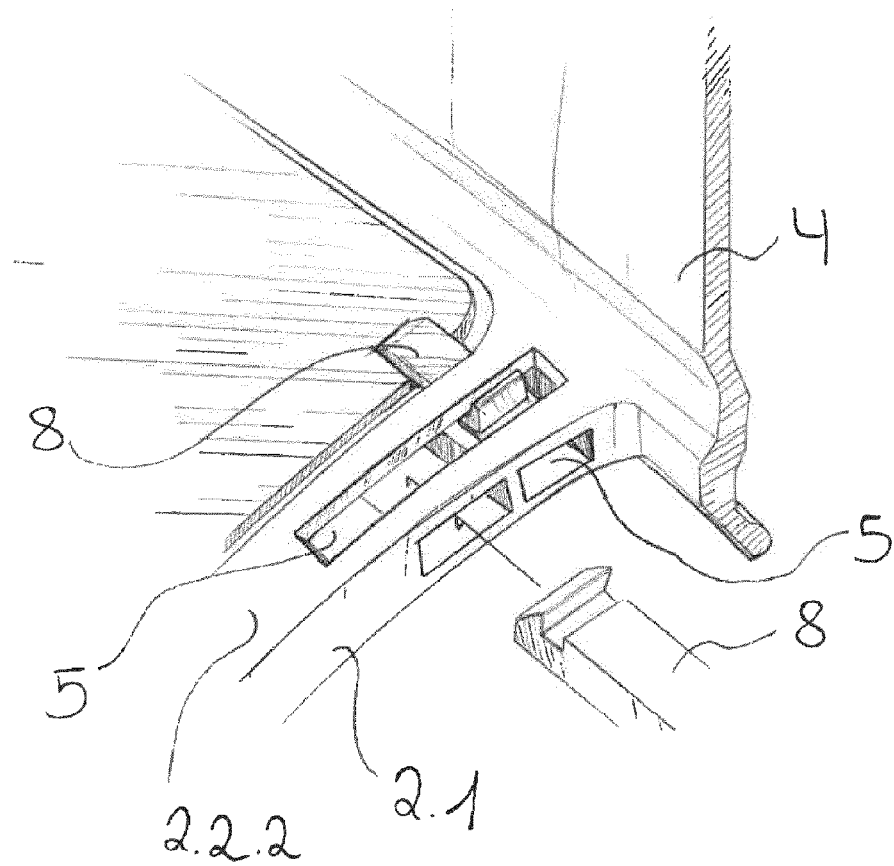
FIG. 9 shows a spoke of a ready cast vehicle wheel in accordance with an embodiment of the present invention from the rear, in which spoke connecting elements engage.

It is furthermore possible, as illustrated in FIG. 9, for the apertures 5 mentioned to be formed on the spoke side surface 2.1 by removal of the lost core 7 while an opening 5 is introduced on the spoke inner surface 2.2.2 by subsequent machining. However, it is alternatively also possible to form this opening 5 on the spoke inner surface 2.2.2 likewise by removal of the lost core 7.

It is in general possible for the ready cast wheel to be further processed mechanically, for example machined, after the casting process.

Furthermore, it is possible here, as can likewise be seen in FIG. 9, for the openings 5 on the spoke inner surface 2.2.2 and on the spoke side surfaces 2.1 to constitute a fastening device, by means of which fastening device cover elements 8 or other components to be fastened to the spoke 2 can be fastened to or arranged on the spoke 2. Such a cover element 8 can be, for example, an element which is used for at least partially covering the spoke intermediate space 3.

LIST OF REFERENCE SIGNS 1 hub section
2 spoke
2.1 spoke side surface
2.2.1 spoke outer surface
2.2.2 spoke inner surface
3 spoke intermediate space
4 rim
5 opening
6 recess
7 lost cores
8 cover element
A axial direction/axis of rotation

What is claimed is:

1. A method for producing a one-piece cast vehicle wheel having a hub section connected to a rim via a plurality of spokes oriented in a radial direction of the wheel, comprising the acts of:
    inserting at least one lost core into a mold of a casting machine, the at least one lost core extended circumferentially across at least two spokes of the plurality of spokes;
    casting the one-piece cast vehicle wheel; and
    removing the at least one lost core from the cast vehicle wheel by destruction of the at least one core,
    where after removal of the at least one lost core at least one opening is present in each of the at least two spokes where the at least one core was located during casting.

2. The method according to claim 1, wherein
    the at least one opening is formed on at least one spoke side surface of each of the at least two spokes, the at least one spoke side surface being aligned at least approximately in an axial direction of the wheel.

3. The method according to claim 2, wherein
    after removal of the at least one lost core the at least one opening includes at least one opening on one or both of a spoke outer surface and a spoke inner surface.

4. The method according to claim 1, wherein
    the at least one lost core is formed by a core shooting method or a 3D printing method.

5. The method according to claim 1, wherein,
    after the casting the at least two spokes of the vehicle wheel is one or more of machined, blasted and trowalized.

6. The method according to claim 1, wherein
    a part of a spoke surface of each of the at least two spokes in which no opening is present after removal of the at least one core is mechanically processed such that an additional opening is formed which opens in the at least one opening formed by the at least one lost core.

7. The method according to claim 1, wherein
    after removal of the at least one lost core the at least one opening is configured to receive a cover element.

8. The method according to claim 7, wherein
    the cover element is configured to cover one or both of a spoke intermediate space and a wheel cap.

9. A vehicle wheel, comprising:
    a one-piece wheel having a hub section, a rim and a plurality of spokes in a radial direction of the wheel, wherein
        the one piece wheel is formed by inserting at least one lost core into a mold of a casting machine, the at least one lost core extended circumferentially across at least two spokes of the plurality of spokes, casting the one-piece cast vehicle wheel, and removing the at least one lost core from the cast vehicle wheel by destruction of the at least one core, and after removal of the at least one lost core at least one opening is present in each of the at least two spokes where the at least one core was located during casting.

10. The vehicle wheel according to claim 9, wherein the at least one opening is one or more of a recess, an undercut and aperture arranged on a spoke side surface of each of the at least two spokes.

11. The vehicle wheel according to claim 9, wherein the at least one lost core protrudes through each of the at least two spokes after the casting process of the vehicle wheel and before removal of the at least one lost core in a circumferential direction of the vehicle wheel.

12. The vehicle wheel according to claim 11, wherein the at least two spokes includes at least two adjacent spokes, and
after casting and before removal of the at least one lost core, the at least one lost core is arranged in mutually facing spoke side surfaces of the at least two adjacent spokes and protrudes into at least two spoke intermediate spaces.

13. The vehicle wheel according to claim 9, wherein the at least one lost core is formed with at least a portion which is ring-shaped.

14. The vehicle wheel according to claim 9, wherein after removal of the at least one lost core the at least one opening is configured to receive a cover element.

15. The vehicle wheel according to claim 14, further comprising:
a cover element is configured to cover one or both of a spoke intermediate space and a wheel cap.

16. The vehicle wheel according to claim 9, wherein after removal of the at least one lost core the at least one opening in each of the at least two spokes includes at least one opening on one or both of a spoke outer surface and a spoke inner surface.

\* \* \* \* \*